(12) United States Patent
Wu et al.

(10) Patent No.: US 9,893,779 B2
(45) Date of Patent: Feb. 13, 2018

(54) METHOD AND APPARATUS FOR CHANNEL CALIBRATION AMONG MULTIPLE RRUS

(71) Applicant: Huawei Technologies Co., Ltd., Shenzhen, Guangdong (CN)

(72) Inventors: Liangming Wu, Chengdu (CN); Xiongshu Yi, Chengdu (CN); Qing Wang, Reading (GB)

(73) Assignee: Huawei Technologies Co., Ltd., Shenzhen (CN)

(*) Notice: Subject to any disclaimer, the term of this patent is extended or adjusted under 35 U.S.C. 154(b) by 103 days.

(21) Appl. No.: 14/966,334

(22) Filed: Dec. 11, 2015

(65) Prior Publication Data
US 2016/0099762 A1    Apr. 7, 2016

Related U.S. Application Data

(63) Continuation of application No. PCT/CN2014/079849, filed on Jun. 13, 2014.

(30) Foreign Application Priority Data

Jun. 13, 2013  (CN) .......................... 2013 1 0232727

(51) Int. Cl.
*H04B 7/04*    (2017.01)
*H04B 7/06*    (2006.01)
*H04B 7/0456*  (2017.01)
*H04L 25/03*   (2006.01)
(Continued)

(52) U.S. Cl.
CPC ......... *H04B 7/0456* (2013.01); *H04B 7/0619* (2013.01); *H04B 17/11* (2015.01); *H04L 25/0398* (2013.01); *H04W 24/04* (2013.01)

(58) Field of Classification Search
CPC ... H04L 25/02; H04L 25/0398; H04L 5/0035; H04L 5/006; H04L 25/0224; H04B 7/04; H04B 7/0456; H04B 7/06; H04B 7/0619; H04B 17/11; H04B 7/022; H04W 24/04; H04W 88/08; H04W 88/085; H04J 11/0053
See application file for complete search history.

(56) References Cited

U.S. PATENT DOCUMENTS 7,184,770 B1 *  2/2007  Narasimhan .......... H04W 16/18
                                                    455/423
9,516,664 B2 * 12/2016  Huang ................... H04B 7/024
9,661,511 B2 *  5/2017  Yi .......................... H04W 24/02
(Continued)

FOREIGN PATENT DOCUMENTS

CN       1929672 A      3/2007
CN     101572576 A     11/2009
(Continued)

*Primary Examiner* — Tri H Phan

(57) ABSTRACT

The present invention discloses a method and an apparatus for channel calibration among multiple RRUs, and pertains to the field of communications technologies. The method includes self-calibrating two RRUs to obtain two self-calibration coefficient, exchanging calibration sequences between the two RRUs through an air interface, returning, by one RRU, the calibration sequence received from another RRU to the another RRU in the air interface, and acquiring a calibration coefficient of the another RRU according to the calibration sequences and the self-calibration coefficients.

15 Claims, 11 Drawing Sheets

TO
FIG. 1B

(51) Int. Cl.
*H04B 17/11* (2015.01)
*H04W 24/04* (2009.01)

(56) References Cited

U.S. PATENT DOCUMENTS

| | | | |
|---|---|---|---|
| 2006/0240780 A1* | 10/2006 | Zhu | H04W 74/0808 455/63.4 |
| 2010/0150013 A1* | 6/2010 | Hara | H04L 25/0224 370/252 |
| 2011/0075715 A1* | 3/2011 | Kravitz | H04B 1/30 375/221 |
| 2011/0292978 A1* | 12/2011 | Kravitz | H04B 1/30 375/221 |
| 2012/0208584 A1* | 8/2012 | Liao | H04B 17/12 455/509 |
| 2012/0250534 A1* | 10/2012 | Langer | H04B 17/13 370/252 |
| 2012/0252366 A1* | 10/2012 | Aoki | H04B 17/12 455/63.1 |
| 2014/0269554 A1* | 9/2014 | Shapira | H04B 17/0007 370/329 |
| 2015/0189669 A1 | 7/2015 | Huang et al. | |
| 2015/0200740 A1* | 7/2015 | Yi | H04J 11/0053 370/329 |
| 2015/0222336 A1* | 8/2015 | Yilmaz | H04B 7/024 370/252 |
| 2016/0197745 A1* | 7/2016 | Yi | H04L 25/0204 370/329 |

FOREIGN PATENT DOCUMENTS

| | | |
|---|---|---|
| CN | 101958734 A | 1/2011 |
| CN | 102315868 A | 1/2012 |
| CN | 102891708 A | 1/2013 |
| EP | 1954075 A1 | 8/2008 |

\* cited by examiner

Cell 0    Cell 1

S301 — Perform precoding on the third calibration sequence received by RRU0

S302 — Return a precoded third calibration sequence to RRU1 through an air interface S303 — RRU1 receives a signal returned by RRU0, and performs demodulation on the signal to obtain the third calibration sequence S304 — RRU1 returns an ACK or NACK to RRU0

METHOD AND APPARATUS FOR CHANNEL CALIBRATION AMONG MULTIPLE RRUS

CROSS-REFERENCE TO RELATED APPLICATIONS

This application is a continuation of International Application No. PCT/CN2014/079849, filed on Jun. 13, 2014, which claims priority to Chinese Patent Application No. 201310232727.8, filed on Jun. 13, 2013, both of which are hereby incorporated by reference in their entireties.

TECHNICAL FIELD

The present invention relates to the field of communications technologies, and in particular, to a method and an apparatus for channel calibration among multiple RRUs.

BACKGROUND

In a TDD (time division duplex) system, a base station performs estimation on an uplink channel by detecting an SRS (sounding reference signal) signal sent by a UE (user equipment) and uses an estimated uplink channel as a downlink channel to perform beamforming according to reciprocity of an uplink and a downlink of the TDD system. Theoretically, an uplink and a downlink in the TDD system are reciprocal; however, in an actual system, different intermediate radio frequency transceiving channel responses in the base station are respectively introduced to uplink and downlink channel responses. By means of theoretical analysis, it is found that if ratios of transmit channel responses to receive channel responses of any two intermediate radio frequency channels are different, an effect of coherent transmission is affected. Therefore, compensation needs to be performed on each intermediate radio frequency transceiving channel, which is referred to as channel calibration. Currently, there is a mature method for channel calibration for a single cell.

CoMP (Coordinated Multi-Point, coordinated multi-point transmission) is a key feature of an LTE (Long Term Evolution) system. A problem of interference on an edge of an LTE cell may be effectively resolved by using a CoMP technology. A base station side in the LTE system may include a BBU (baseband unit), and each BBU may be connected to multiple RRUs (remote radio unit). As one type of CoMP technology, a JT (joint transmission) technology may significantly increase cell edge throughput and average throughput. To implement a gain brought by the JT technology in the TDD system, channel calibration needs to be performed as well in the TDD system. Different from a single-cell beamforming technology, the JT technology requires that ratios of uplink radio frequency channel responses to downlink radio frequency channel responses are the same, where the uplink and downlink radio frequency channel responses are corresponding to various antennas of multiple cells. Even though channel calibration is performed on each cell, if calibration among cells is not performed, the JT technology still cannot achieve expected performance. Currently, a channel calibration technology for a single RRU is relatively mature; however, joint calibration among multiple RRU channels is still a difficult problem in the industry.

SUMMARY

To resolve a problem of channel calibration among multiple RRUs, embodiments of the present invention provide a method and an apparatus for channel calibration among multiple RRUs. The technical solutions are as follows:

According to a first aspect, a method for channel calibration among multiple RRUs is provided, and is used for joint channel calibration among multiple RRUs in a communications system, where the communications system includes at least a first RRU and a second RRU, and the method includes: separately performing self-calibration on the first RRU and the second RRU, and respectively acquiring a first self-calibration coefficient and a second self-calibration coefficient; transmitting a first calibration sequence to the second RRU by using the first RRU, where the first calibration sequence becomes a second calibration sequence when arriving at the second RRU; transmitting the first calibration sequence to the first RRU by using the second RRU, where the first calibration sequence becomes a third calibration sequence when arriving at the first RRU; sending the third calibration sequence received by the first RRU to the second RRU; and acquiring a calibration coefficient of the second RRU according to the second calibration sequence, the third calibration sequence, and the second self-calibration coefficient.

In a first possible implementation manner of the first aspect, the sending the third calibration sequence received by the first RRU to the second RRU includes: returning, through an air interface, the third calibration sequence received by the first RRU to the second RRU.

In a second possible implementation manner of the first possible implementation manner of the first aspect, the returning, through an air interface, the third calibration sequence received by the first RRU to the second RRU includes: performing precoding on the third calibration sequence received by the first RRU; and returning a precoded third calibration sequence to the second RRU through the air interface.

In a third possible implementation manner of the second possible implementation manner of the first possible implementation manner of the first aspect, the returning a precoded third calibration sequence to the second RRU through the air interface includes: inserting the precoded third calibration sequence into an idle timeslot, where the idle timeslot and a timeslot for sending the first calibration sequence are the same, and returning the precoded third calibration sequence to the second RRU by using the idle timeslot.

In a fourth possible implementation manner of the second possible implementation manner of the first possible implementation manner of the first aspect, the returning a precoded third calibration sequence to the second RRU through the air interface includes:

inserting the precoded third calibration sequence into a service subframe, and returning the precoded third calibration sequence to the second RRU by using the service subframe.

According to a second aspect, an apparatus for channel calibration among multiple RRUs is provided, and is configured to perform joint channel calibration among multiple RRUs in a communications system, where the communications system includes at least a first RRU and a second RRU, and the apparatus includes:

a self-calibrator, configured to: separately perform self-calibration on the first RRU and the second RRU, and respectively acquire a first self-calibration coefficient and a second self-calibration coefficient;

a first controller, configured to transmit a first calibration sequence to the second RRU by using the first RRU, where the first calibration sequence becomes a second calibration sequence when arriving at the second RRU;

a second controller, configured to transmit the first calibration sequence to the first RRU by using the second RRU, where the first calibration sequence becomes a third calibration sequence when arriving at the first RRU;

a transmitter, configured to send the third calibration sequence received by the first RRU to the second RRU; and a processor, configured to acquire a calibration coefficient of the second RRU according to the second calibration sequence, the third calibration sequence, and the second self-calibration coefficient.

In a first possible implementation manner of the second aspect, the transmitter is specifically configured to:

return, through an air interface, the third calibration sequence received by the first RRU to the second RRU.

In a second possible implementation manner of the first possible implementation manner of the second aspect, the transmitter includes:

a precoding module, configured to perform precoding on the third calibration sequence received by the first RRU; and a sending module, configured to return a precoded third calibration sequence to the second RRU through the air interface.

In a third possible implementation manner of the second possible implementation manner of the first possible implementation manner of the second aspect, the sending module includes:

a first sending unit, configured to insert the precoded third calibration sequence into an idle timeslot, where the idle timeslot and a timeslot for sending the first calibration sequence are the same, and return the precoded third calibration sequence to the second RRU by using the idle timeslot.

In a fourth possible implementation manner of the second possible implementation manner of the first possible implementation manner of the second aspect, the sending module includes:

a second sending unit, configured to insert the precoded third calibration sequence into a service subframe, and return the precoded third calibration sequence to the second RRU by using the service subframe.

Beneficial effects brought by the technical solutions provided by the embodiments of the present invention are as follows: self-calibration is separately performed on the first RRU and the second RRU, and a first self-calibration coefficient and a second self-calibration coefficient are respectively acquired; a first calibration sequence is transmitted to the second RRU by using the first RRU, where the first calibration sequence becomes a second calibration sequence when arriving at the second RRU; the first calibration sequence is transmitted to the first RRU by using the second RRU, where the first calibration sequence becomes a third calibration sequence when arriving at the first RRU; the third calibration sequence received by the first RRU is sent to the second RRU; and a calibration coefficient of the second RRU is acquired according to the second calibration sequence, the third calibration sequence, and the second self-calibration coefficient, so that joint channel calibration among multiple RRUs is completed based on one reference RRU.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

In the embodiments, an RRU includes multiple intermediate radio frequency channels, which are also referred to as service channels, and the service channels correspond one-to-one to antennas. Each service channel includes one intermediate radio frequency receive channel and one intermediate radio frequency transmit channel, which are respectively defined as a service receive channel and a service transmit channel. In addition to the service channels, the RRU further includes at least one calibration channel for performing channel calibration. The calibration channel includes one intermediate radio frequency receive channel and one intermediate radio frequency transmit channel, which are respectively defined as a calibration receive channel and a calibration transmit channel. In a system, a coupled circuit may be integrated into an antenna. For example, the coupled circuit may be a coupling module that is integrated into the antenna. In addition, the coupled circuit may also be integrated into an RRU.

Figure 1A:
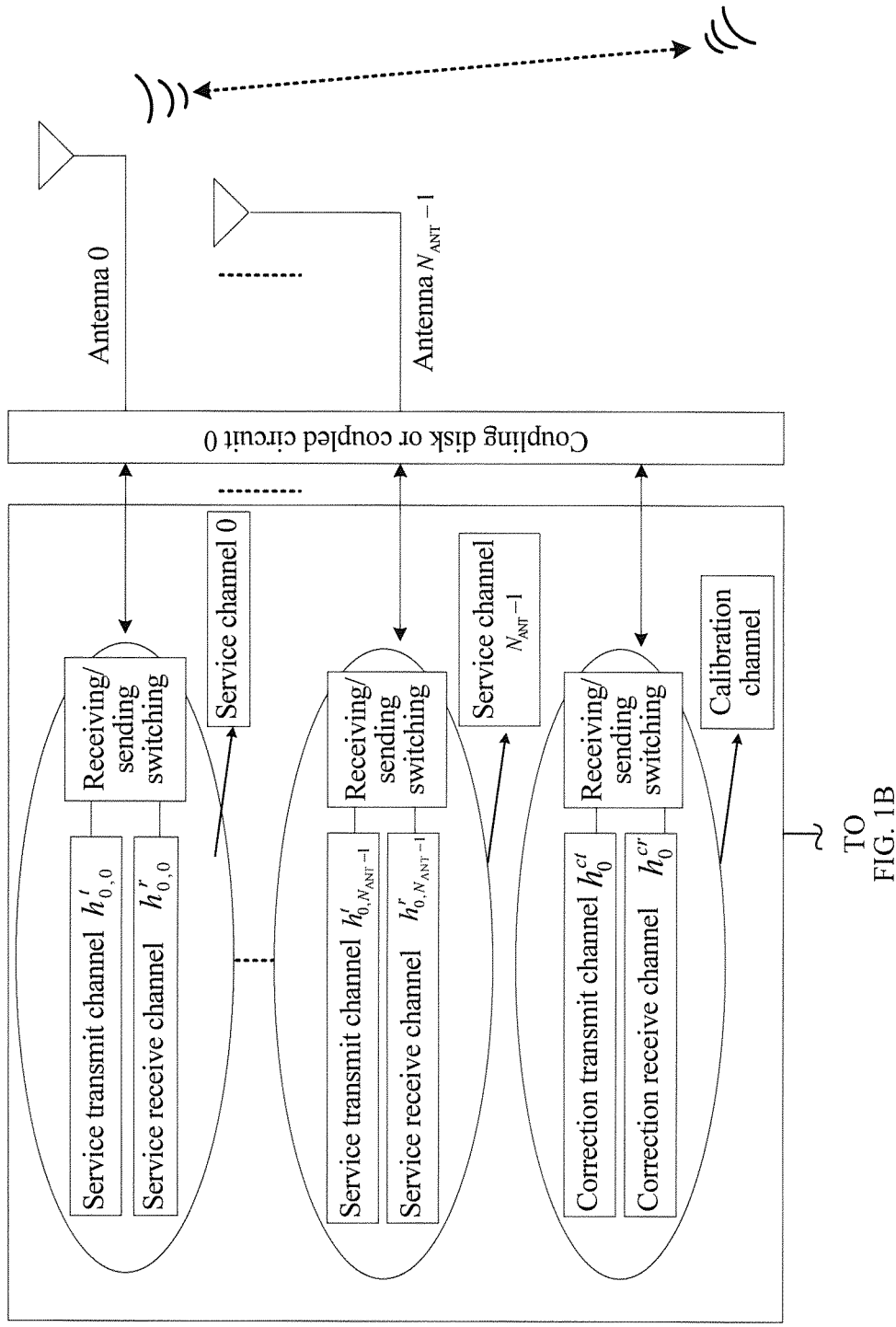
FIG. 1A and FIG. 1B are a schematic diagram of external calibration of joint channel calibration between two RRUs according to an embodiment of the present invention.
Figure 1B:
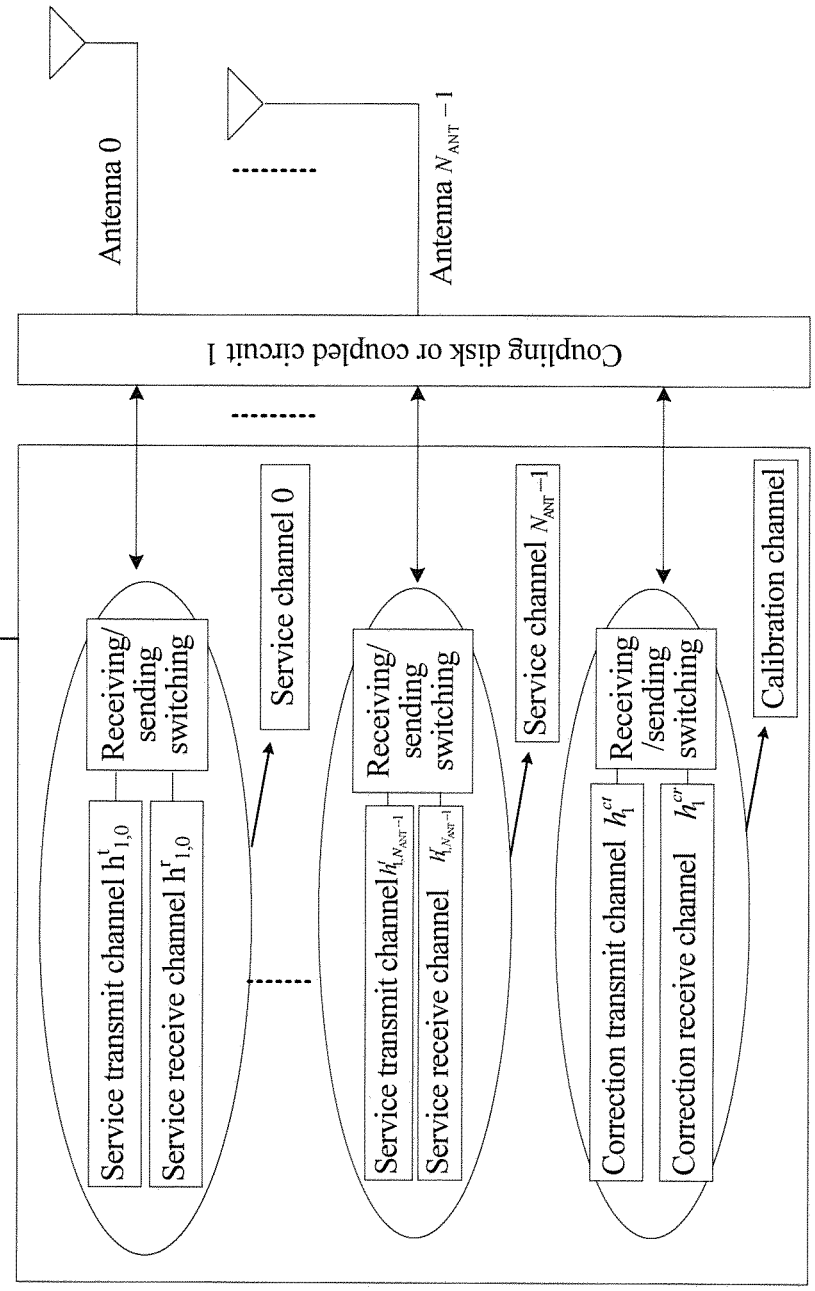
Figure 2A:
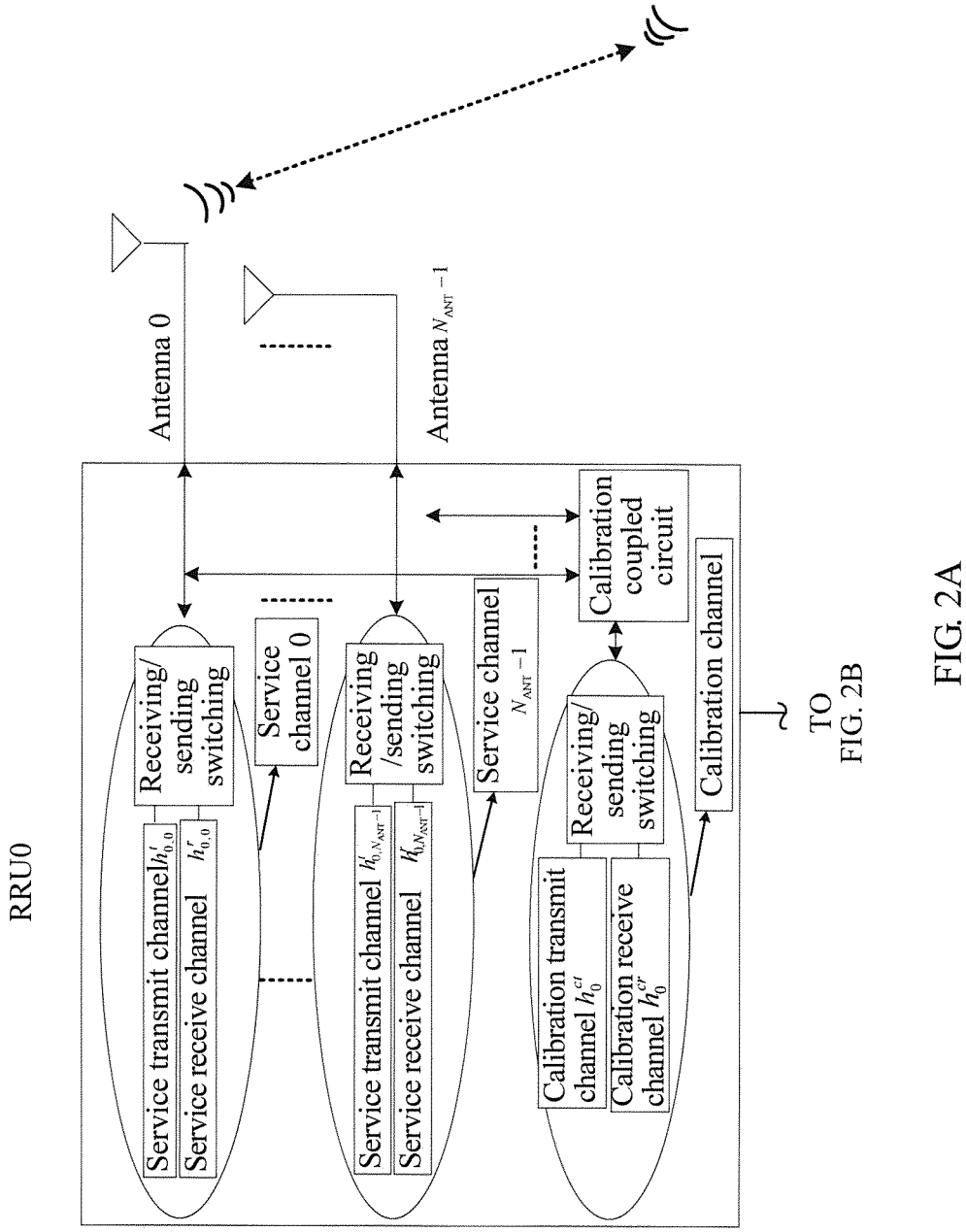
FIG. 2A and FIG. 2B are a schematic diagram of internal calibration of joint channel calibration between two RRUs according to an embodiment of the present invention.
Figure 2B:
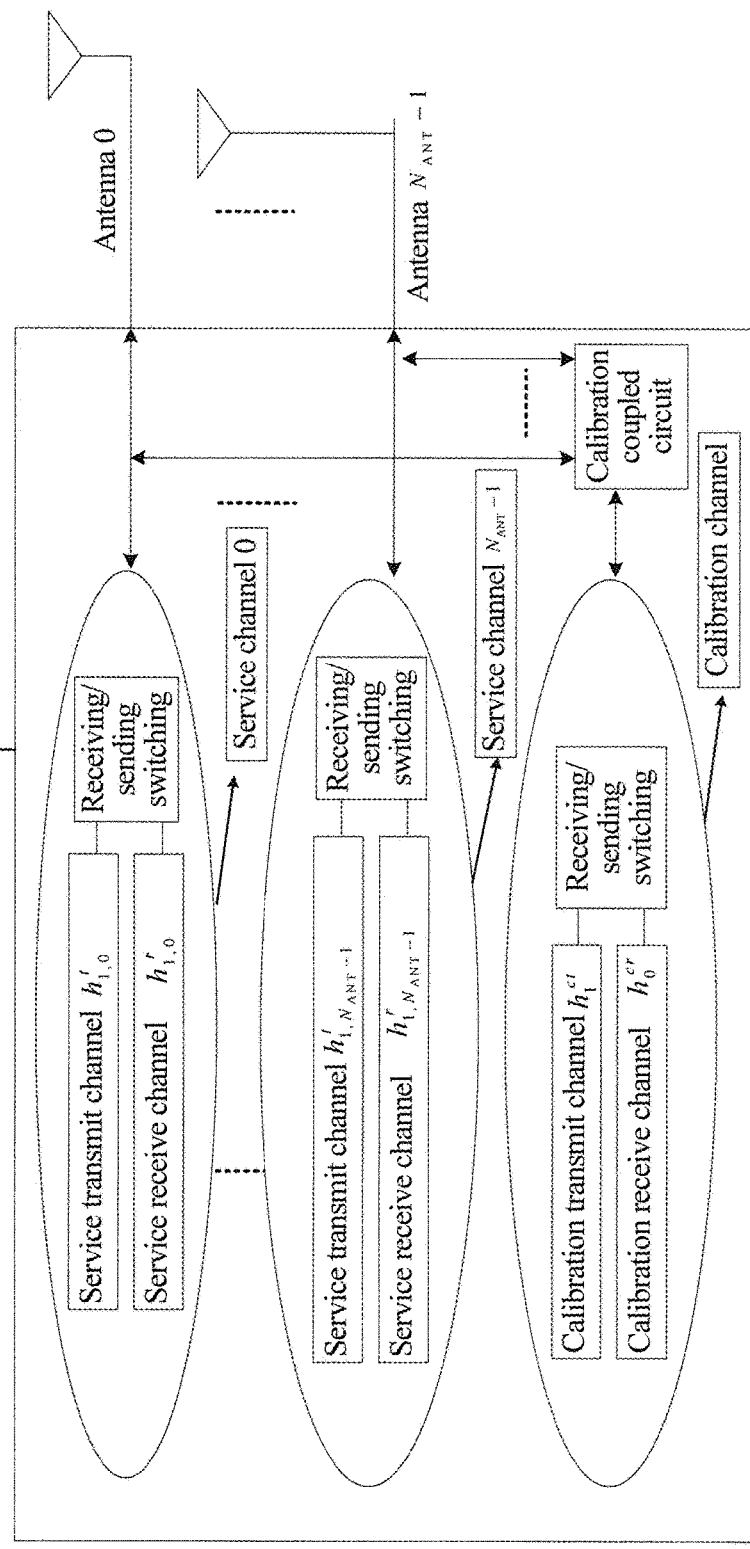

In an embodiment, an example in which channel calibration between two RRUs is performed and each RRU includes four antennas (an actual quantity of antennas may be any integer) is used for description. In this embodiment, i is used to indicate an antenna of an RRU, and i=0, 1, 2, 3. FIG. 1A and FIG. 1B show an external calibration type, FIG. 2A and FIG. 2B show an internal calibration type, and both types are applicable to this embodiment. External calibration indicates that a coupled circuit is not integrated into an RRU, and internal calibration indicates that a coupled circuit is integrated into an RRU. In FIG. 1A, FIG. 1B, FIG. 2A, and FIG. 2B, TRX indicates a service transceiving channel.

Figure 3:
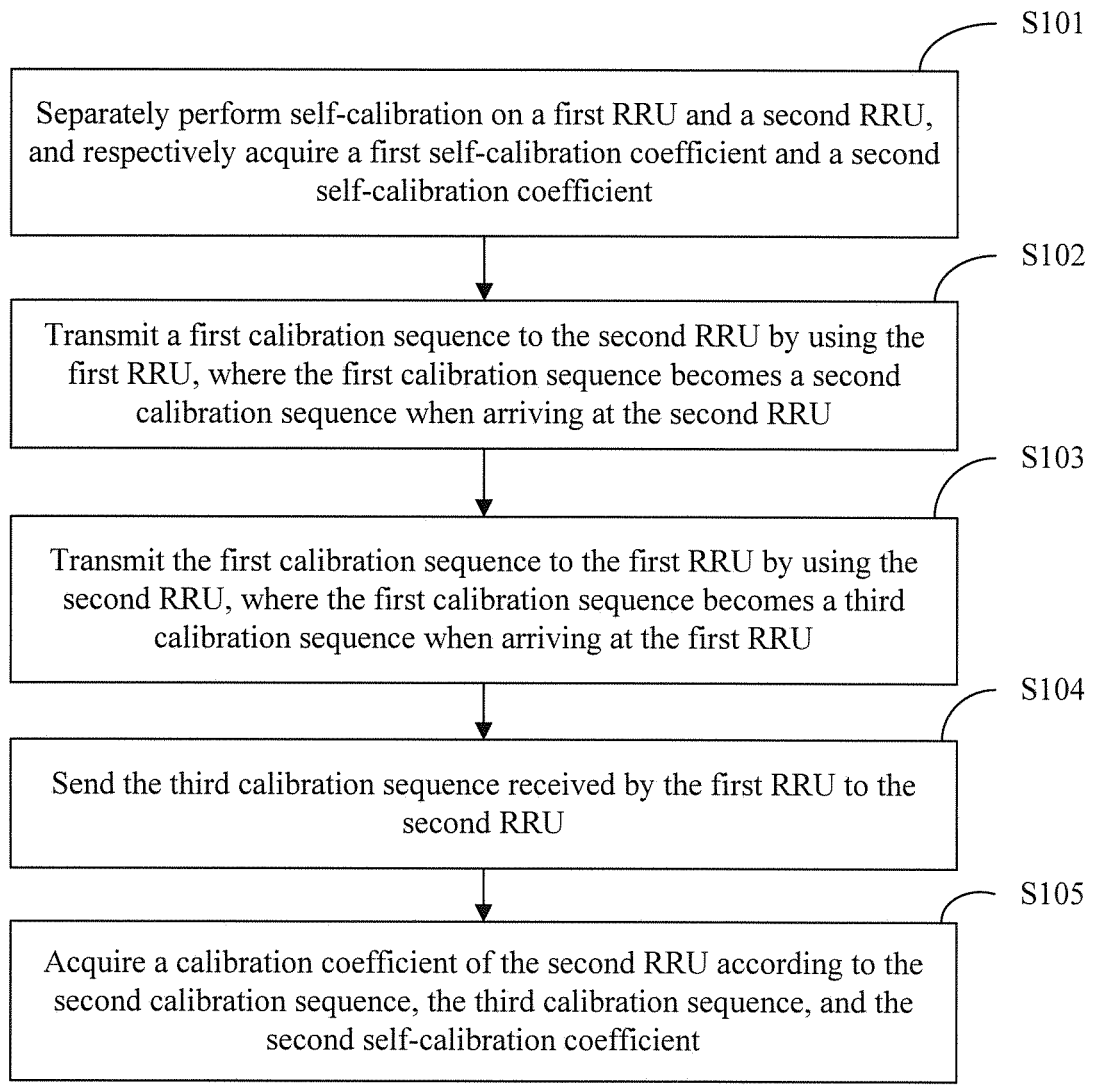
FIG. 3 is a flowchart of a method for channel calibration among multiple RRUs according to an embodiment of the present invention.

FIG. 3 is a schematic flowchart of a method for channel calibration among multiple RRUs that is provided by an embodiment, where the method is used for joint channel calibration among multiple RRUs in a communications system, where the communications system includes at least a first RRU and a second RRU, and a procedure of the method includes:

S101: Separately perform self-calibration on the first RRU and the second RRU, and respectively acquire a first self-calibration coefficient and a second self-calibration coefficient.

S102: Transmit a first calibration sequence to the second RRU by using the first RRU, where the first calibration sequence becomes a second calibration sequence when arriving at the second RRU.

S103: Transmit the first calibration sequence to the first RRU by using the second RRU, where the first calibration sequence becomes a third calibration sequence when arriving at the first RRU.

S104: Send the third calibration sequence received by the first RRU to the second RRU.

S105: Acquire a calibration coefficient of the second RRU according to the second calibration sequence, the third calibration sequence, and the second self-calibration coefficient.

In a first possible implementation manner, the sending the third calibration sequence received by the first RRU to the second RRU includes:

returning, through an air interface, the third calibration sequence received by the first RRU to the second RRU.

In a second possible implementation manner of the first possible implementation manner, the returning, through an air interface, the third calibration sequence received by the first RRU to the second RRU includes:

performing precoding on the third calibration sequence received by the first RRU; and returning a precoded third calibration sequence to the second RRU through the air interface.

In a third possible implementation manner of the second possible implementation manner of the first possible implementation manner, the performing precoding on the third calibration sequence received by the first RRU includes:

performing quantization processing on the third calibration sequence, to obtain a to-be-sent data block;

performing preprocessing on the to-be-sent data block, where the preprocessing includes one or more of the following operations: adding a CRC (Cyclic Redundancy Check, cyclic redundancy check) header to the to-be-sent data block, performing segmentation on the to-be-sent data block, performing error correction coding on the to-be-sent data block, and performing a rate matching operation on the to-be-sent data block; and performing modulation on preprocessed to-be-sent data, to obtain the precoded third calibration sequence.

In a fourth possible implementation manner of the second possible implementation manner of the first possible implementation manner, the returning a precoded third calibration sequence to the second RRU through the air interface includes:

inserting the precoded third calibration sequence into an idle timeslot, where the idle timeslot and a timeslot for sending the first calibration sequence are the same, and returning the precoded third calibration sequence to the second RRU by using the idle timeslot.

In a fifth possible implementation manner of the second possible implementation manner of the first possible implementation manner, the returning a precoded third calibration sequence to the second RRU through the air interface includes:

inserting the precoded third calibration sequence into a service subframe, and returning the precoded third calibration sequence to the second RRU by using the service subframe.

In a sixth possible implementation manner of the first, the second, the third, the fourth, or the fifth possible implementation manner, the first self-calibration coefficient includes a first sending self-calibration coefficient and a first receiving self-calibration coefficient, the second self-calibration coefficient includes a second sending self-calibration coefficient and a second receiving self-calibration coefficient, and the calibration coefficient of the second RRU includes a sending calibration coefficient of the second RRU and a receiving calibration coefficient of the second RRU.

In a seventh possible implementation manner of the first, the second, the third, the fourth, the fifth, or the sixth possible implementation manner, the acquiring a calibration coefficient of the second RRU according to the second calibration sequence, the third calibration sequence, and the second self-calibration coefficient includes:

acquiring a modification coefficient of the second RRU according to the second calibration sequence and the third calibration sequence; and acquiring the calibration coefficient of the second RRU according to the modification coefficient of the second RRU and the second self-calibration coefficient.

In an eighth possible implementation manner of the seventh possible implementation manner, the acquiring the calibration coefficient of the second RRU according to the modification coefficient of the second RRU and the second self-calibration coefficient includes:

using a ratio of the second sending self-calibration coefficient of the second self-calibration coefficient to the modification coefficient of the second RRU as the sending calibration coefficient of the second RRU; or using a product of multiplying the second receiving self-calibration coefficient of the second self-calibration coefficient by the modification coefficient of the second RRU as the receiving calibration coefficient of the second RRU.

In a ninth possible implementation manner of the first, the second, the third, the fourth, the fifth, the sixth, the seventh, or the eighth possible implementation manner, after the acquiring a calibration coefficient of the second RRU according to the second calibration sequence, the third calibration sequence, and the second self-calibration coefficient, the method further includes:

performing calibration on the second RRU according to the calibration coefficient of the second RRU.

Beneficial effects brought by the technical solution provided by this embodiment of the present invention are as follows: self-calibration is separately performed on the first RRU and the second RRU, and a first self-calibration coefficient and a second self-calibration coefficient are respectively acquired; a first calibration sequence is transmitted to the second RRU by using the first RRU, where the first calibration sequence becomes a second calibration sequence when arriving at the second RRU; the first calibration sequence is transmitted to the first RRU by using the second RRU, where the first calibration sequence becomes a third calibration sequence when arriving at the first RRU; the third calibration sequence received by the first RRU is sent to the second RRU; and a calibration coefficient of the second RRU is acquired according to the second calibration sequence, the third calibration sequence, and the second self-calibration coefficient, so that joint channel calibration among multiple RRUs is completed based on one reference RRU.

Figure 4:
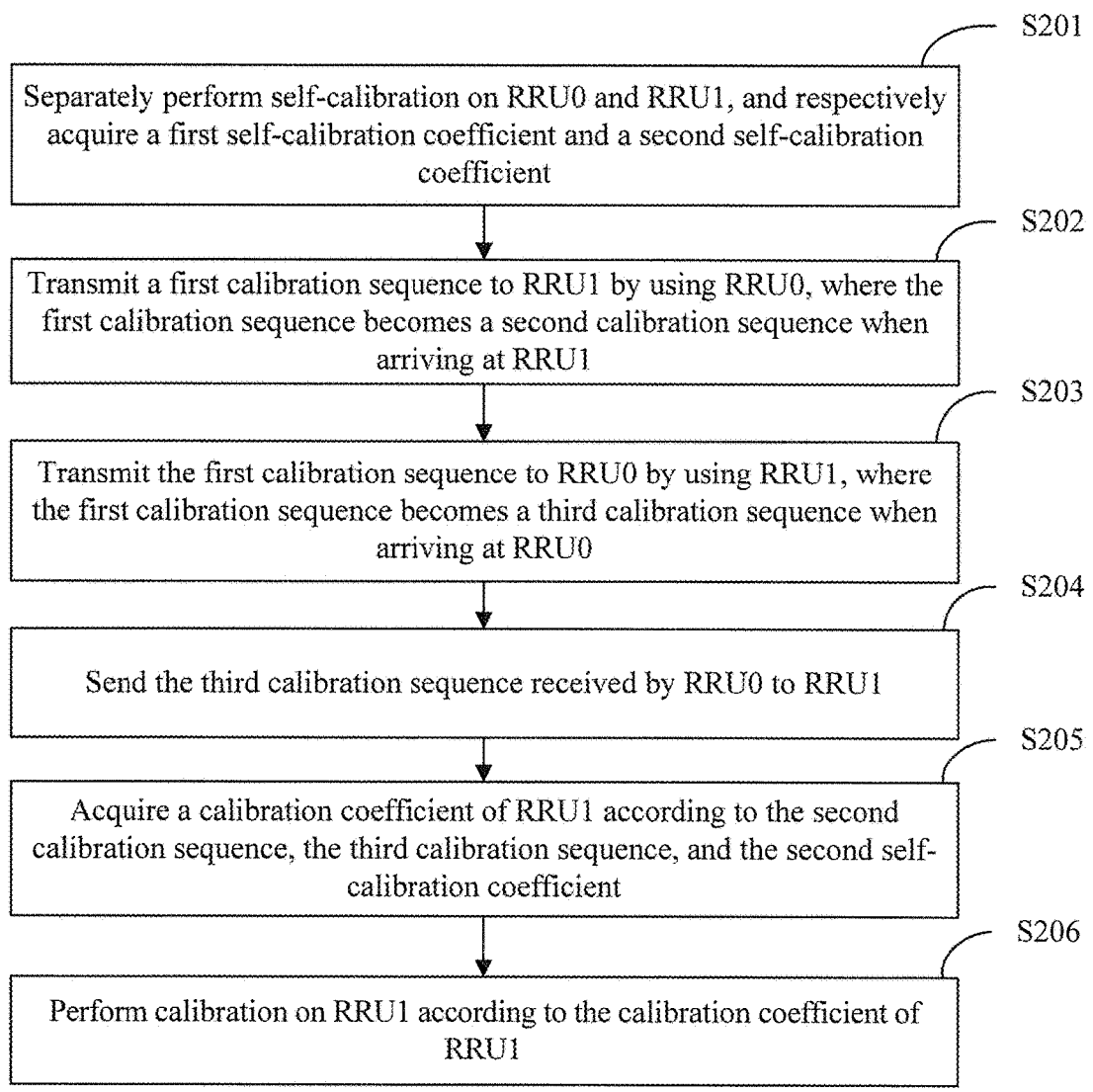
FIG. 4 is a flowchart of a method for channel calibration among multiple RRUs according to another embodiment of the present invention.

An embodiment provides a method for channel calibration between two RRUs, to perform channel calibration on RRU0 and RRU1, where any one of the two RRUs is selected as a reference RRU, and calibration is performed on the other RRU according to the reference RRU. In this embodiment, an example in which RRU0 is used as a reference RRU and calibration is performed on RRU1 according to RRU0 is used for description. As shown in FIG. 4, the method includes:

S201: Separately perform self-calibration on RRU0 and RRU1, and respectively acquire a first self-calibration coefficient and a second self-calibration coefficient.

In this embodiment, RRU0 and RRU1 are respectively a first RRU and a second RRU. A method for performing self-calibration on a single RRU is the prior art, and details are not described again in this embodiment. After completing self-calibration, RRU0 and RRU1 respectively obtain their self-calibration coefficients. A self-calibration coefficient further includes a service transmit channel self-calibration coefficient (sending self-calibration coefficient for short) and a service receive channel self-calibration coefficient (receiving self-calibration coefficient for short). Compensation is performed on uplink receiving and downlink transmission by using the receiving self-calibration coefficient and the sending self-calibration coefficient respectively, thereby satisfying a requirement of a TDD system for reciprocity of an uplink and a downlink of a single RRU.

A receiving self-calibration coefficient $\beta_{k,i}^{UL}(n)$ may be indicated as:

$$\beta_{k,i}^{UL}(n) = \frac{1}{h_k^{ct}(n) h_{k,i}^{r}(n)}, k = 0, 1; \qquad (1)$$

where
when k+0, the receiving self-calibration coefficient is:

$$\beta_{0,i}^{UL}(n) = \frac{1}{h_0^{ct}(n) h_{0,i}^{r}(n)}; \qquad (2)$$

and
when k=1, the receiving self-calibration coefficient is:

$$\beta_{1,i}^{UL}(n) = \frac{1}{h_1^{ct}(n) h_{1,i}^{r}(n)}; \qquad (3)$$

where
k indicates the $k^{th}$ RRU, wherein this embodiment, k indicates RRU0 when being 0, and k indicates RRU1 when being 1; n indicates the $n^{th}$ subcarrier, and n=0, 1, ..., N−1, where N indicates a quantity of subcarriers; i indicates the $i^{th}$ service receive channel; $h_k^{ct}(n)$ indicates a channel response of a calibration transmit channel of the $k^{th}$ RRU on the $n^{th}$ subcarrier; $h_{k,i}^{r}(n)$ indicates a channel response of the $i^{th}$ service receive channel of the $k^{th}$ RRU on the $n^{th}$ subcarrier.

The sending self-calibration coefficient may be indicated as:

$$\beta_{k,i}^{DL}(n) = \frac{1}{h_k^{cr}(n) h_{k,i}^{t}(n)}, k = 0, 1; \qquad (4)$$

where
when k=0, the sending self-calibration coefficient is:

$$\beta_{0,i}^{DL}(n) = \frac{1}{h_0^{cr}(n) h_{0,i}^{t}(n)}; \qquad (5)$$

and
when k=1, the sending self-calibration coefficient is:

$$\beta_{1,i}^{DL}(n) = \frac{1}{h_1^{cr}(n) h_{1,i}^{t}(n)}; \qquad (6)$$

where
k indicates the $k^{th}$ RRU, where in this embodiment, k indicates RRU0 when being 0, and k indicates RRU1 when being 1; n indicates the $n^{th}$ subcarrier, and n=0, 1, ..., N−1; i indicates the $i^{th}$ transmit channel; $h_k^{cr}(n)$ indicates a channel response of a calibration receive channel of the $k^{th}$ RRU on the $n^{th}$ subcarrier; $h_{k,i}^{t}(n)$ indicates a channel response of the $i^{th}$ service transmit channel of the $k^{th}$ RRU on the $n^{th}$ subcarrier.

After completing self-calibration, RRU0 may be indicated by using the following formula:

$$\frac{\beta_{0,0}^{UL}(n) h_{0,0}^{r}(n)}{\beta_{0,0}^{DL}(n) h_{0,0}^{t}(n)} = \qquad (7)$$

$$\frac{\beta_{0,1}^{UL}(n) h_{0,1}^{r}(n)}{\beta_{0,1}^{DL}(n) h_{0,1}^{t}(n)} = \ldots = \frac{\beta_{0,N_{ANT}-1}^{UL}(n) h_{0,N_{ANT}-1}^{r}(n)}{\beta_{0,N_{ANT}-1}^{DL}(n) h_{0,N_{ANT}-1}^{t}(n)} = \frac{h_0^{cr}(n)}{h_0^{ct}(n)};$$

After completing self-calibration, RRU1 may be indicated by using the following formula:

$$\frac{\beta_{1,0}^{UL}(n) h_{1,0}^{r}(n)}{\beta_{1,0}^{DL}(n) h_{1,0}^{t}(n)} = \qquad (8)$$

$$\frac{\beta_{1,1}^{UL}(n) h_{1,1}^{r}(n)}{\beta_{1,1}^{DL}(n) h_{1,1}^{t}(n)} = \ldots = \frac{\beta_{1,N_{ANT}-1}^{UL}(n) h_{1,N_{ANT}-1}^{r}(n)}{\beta_{1,N_{ANT}-1}^{DL}(n) h_{1,N_{ANT}-1}^{t}(n)} = \frac{h_1^{cr}(n)}{h_1^{ct}(n)};$$

In the foregoing formulas, after RRU0 and RRU1 complete self-calibration, $N_{ANT}-1$ indicates a quantity of antennas of an RRU. In addition, that RRU0 and RRU1 have a same quantity of antennas is used as an example for description of the formulas. This method is also applicable to an RRU with any quantity of antennas.

Optionally, a transceiving joint self-calibration coefficient is indicated as a ratio of the receiving self-calibration coefficient to the sending self-calibration coefficient:

$$\tilde{\beta}_{k,i}(n) = \frac{\beta_{k,i}^{UL}(n)}{\beta_{k,i}^{DL}(n)};\qquad(9)$$

After completing self-calibration, RRU0 may be indicated, by using the transceiving joint self-calibration coefficient, as the following formula:

$$\frac{\tilde{\beta}_{0,0}(n)h_{0,0}^{r}(n)}{h_{0,0}^{t}(n)} = \frac{\tilde{\beta}_{0,1}(n)h_{0,1}^{r}(n)}{h_{0,1}^{t}(n)} = \ldots = \frac{\tilde{\beta}_{0,N_{ANT}-1}(n)h_{0,N_{ANT}-1}^{r}(n)}{h_{0,N_{ANT}-1}^{t}(n)} = \frac{h_{0}^{cr}(n)}{h_{0}^{ct}(n)};\qquad(10)$$

After completing self-calibration, RRU1 may be indicated, by using the transceiving joint self-calibration coefficient, as the following formula:

$$\frac{\tilde{\beta}_{1,0}(n)h_{1,0}^{r}(n)}{h_{1,0}^{t}(n)} = \frac{\tilde{\beta}_{1,1}(n)h_{1,1}^{r}(n)}{h_{1,1}^{t}(n)} = \ldots = \frac{\tilde{\beta}_{1,N_{ANT}-1}(n)h_{1,N_{ANT}-1}^{r}(n)}{h_{1,N_{ANT}-1}^{t}(n)} = \frac{h_{1}^{cr}(n)}{h_{1}^{ct}(n)};\qquad(11)$$

It can be seen that, after RRU0 and RRU1 complete self-calibration, a first sending self-calibration coefficient and a first receiving self-calibration coefficient enable ratios of uplinks of channels in RRU0 to downlinks of the channels in RRU0 to be the same, and a second sending self-calibration coefficient and a second receiving self-calibration coefficient enable ratios of uplinks of channels in RRU0 to downlinks of the channels in RRU0 to be the same. However, ratios of uplinks of RRU0 to downlinks of RRU1 are different from those of RRU1.

S202: Transmit a first calibration sequence to RRU1 by using RRU0, where the first calibration sequence becomes a second calibration sequence when arriving at RRU1.

One antenna is randomly selected from RRU0 and RRU1 separately. As described in the foregoing, each service channel in an RRU is corresponding to one antenna; therefore, in this embodiment, randomly selecting an antenna and randomly selecting a service channel have a same meaning. One antenna is randomly selected from RRU0 and RRU1 separately. For example, an antenna 0 corresponding to the 0$^{th}$ service channel TRX0 of RRU0 is selected in RRU0, and an antenna 0 corresponding to the 0$^{th}$ service channel TRX0 of RRU1 is also selected in RRU1. In this embodiment, the antenna 0 in RRU0 is a first antenna, and the antenna 0 in RRU1 is a second antenna. Because RRU0 is the reference RRU, a channel corresponding to the first antenna is a reference channel. Calibration relative to the first antenna is performed on a sending calibration coefficient or a receiving calibration coefficient of another antenna of RRU0, and calibration relative to the second antenna is performed on a sending calibration coefficient or a receiving calibration coefficient of another antenna of RRU1.

Figure 5A:
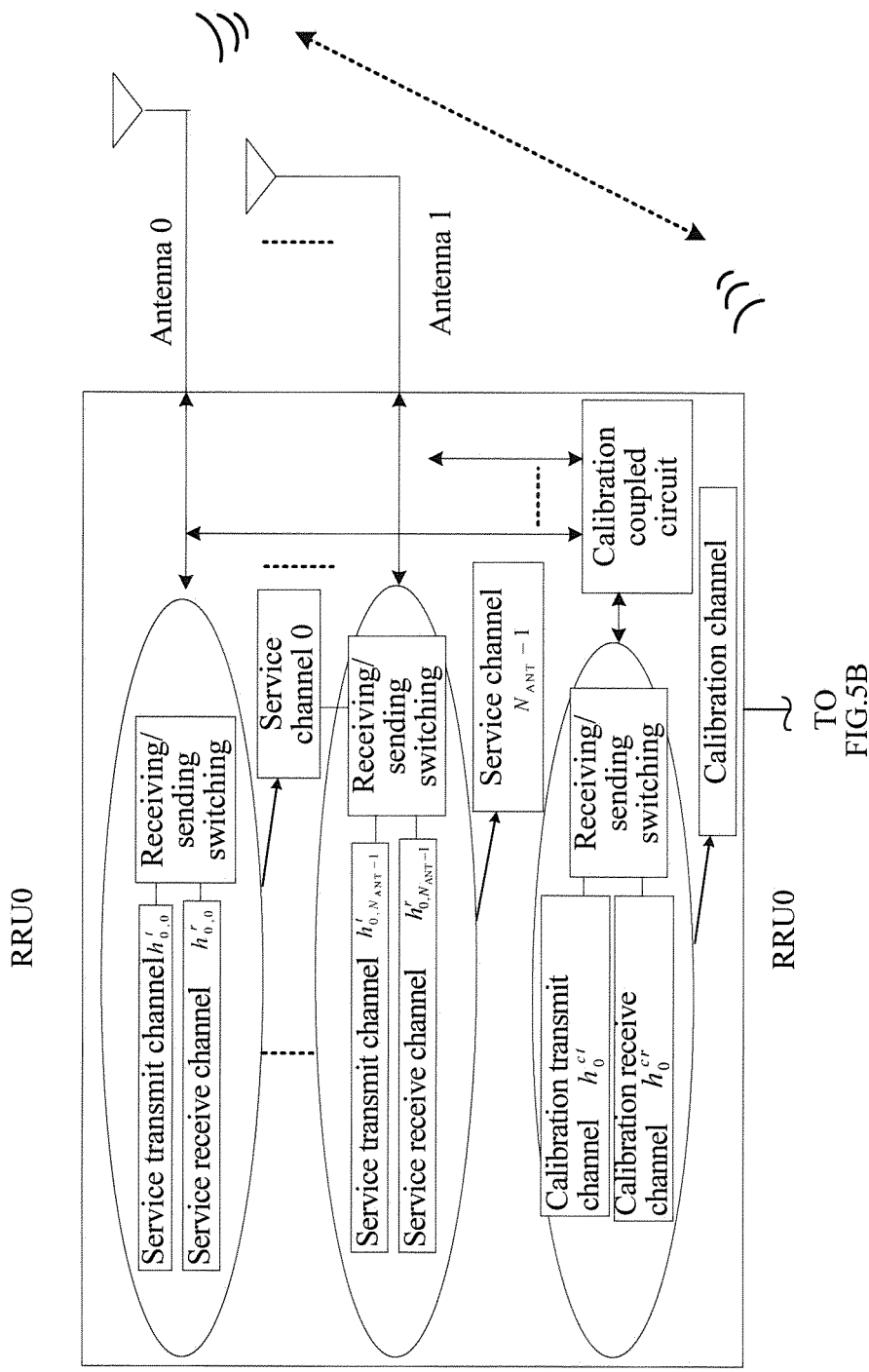
FIG. 5A and FIG. 5B are a schematic diagram of selecting an antenna for transmitting and receiving a calibration signal during joint channel calibration between two RRUs according to another embodiment of the present invention.
Figure 5B:
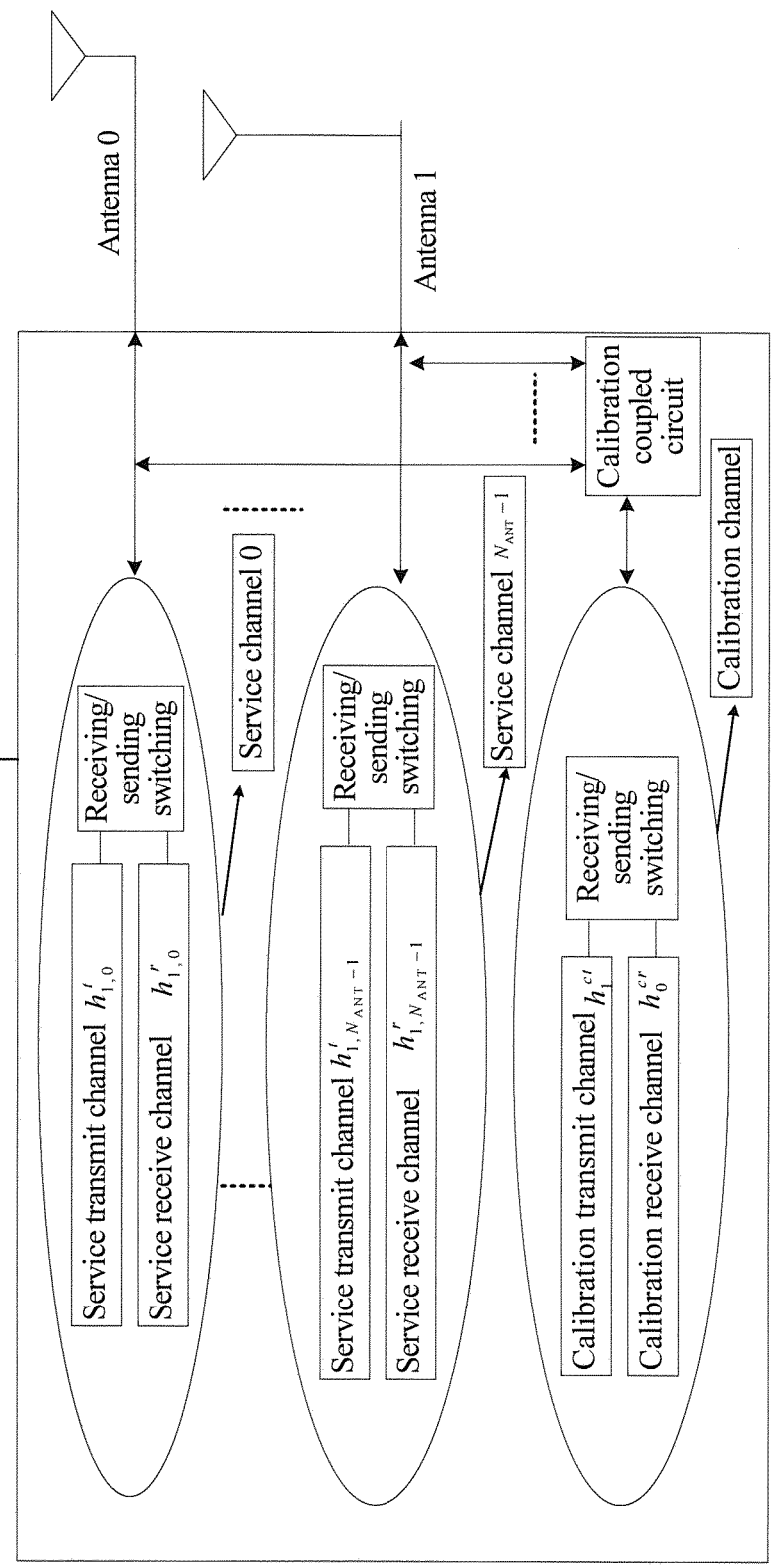

Optionally, during antenna selection, an antenna with best received signal strength or signal quality may be selected from an RRU. In addition, antenna radiation direction adjustment may also be performed based on at least one of the following manners: digital weighting, intermediate frequency weighting, radio frequency phase shift, and physical movement, to achieve received signal strength or signal quality that meets a requirement during communication between the RRUs. Exchange of information such as received signal strength or a signal quality indication may be completed by using an X2 interface or a private communications interface. For example, in FIG. 5A and FIG. 5B:

the antenna 0 of RRU0 performs transmission, the antenna 0 of RRU1 performs receiving, and the signal strength or the signal quality indication is x00;

the antenna 1 of RRU0 performs transmission, the antenna 0 of RRU1 performs receiving, and the signal strength or the signal quality indication is x01;

the antenna 0 of RRU0 performs transmission, the antenna 1 of RRU1 performs receiving, and the signal strength or the signal quality indication is x10; and the antenna 1 of RRU0 performs transmission, the antenna 1 of RRU1 performs receiving, and the signal strength or the signal quality indication is x11.

A sending antenna of RRU0 may be implicitly indicated by using information such as a frame number or different transmit signals, and a baseband corresponding to RRU1 completes selection of an optimal antenna pair according to x00, x01, x10, and x11. The optimal antenna pair is used to transmit and receive signals between the RRUs during joint channel calibration between the RRUs. After antennas are selected, for example, the antenna 0 is selected in each RRU, RRU0 sends a first calibration sequence s(n) by using the antenna 0. After passing through a transmit channel of RRU0 and a receive channel of RRU1 and arriving at RRU1, the first calibration sequence becomes a second calibration sequence $r_{1,0}(n)$, where $$r_{1,0}(n) = h_{1,0}^{r}(n) \cdot h_{Air,10}(n) \cdot h_{0,0}^{t}(n) \cdot s(n);\qquad(12); \text{where}$$

$h_{Air,10}(n)$ is a channel response of an air interface of RRU1, where in a TDD system, channel responses of an air interface in an uplink and a downlink are equal, and therefore, neither a downlink (Downlink, DL) nor an uplink (Uplink, UL) is marked; $h_{0,0}^{t}(n)$ indicates a channel response of the 0$^{th}$ service transmit channel of RRU0 on the n$^{th}$ subcarrier; and $h_{1,0}^{r}(n)$ indicates a channel response of the 0$^{th}$ service receive channel of RRU1 on the n$^{th}$ subcarrier.

The first calibration sequence s(n) is a specific calibration reference sequence that is selected, for example, various training sequences or reference signal sequences used in LTE and Worldwide Interoperability for Microwave Access (Worldwide Interoperability for Microwave Access, WiMAX) systems, and this embodiment sets no specific limitation thereto.

Optionally, when RRU0 sends the first calibration sequence by using the antenna 0, transmit channels in RRU0 except a transmit channel of a service channel 0 corresponding to the antenna 0 are disabled, to avoid interference.

S203: Transmit the first calibration sequence to RRU0 by using RRU1, where the first calibration sequence becomes a third calibration sequence when arriving at RRU0.

A method for transmitting the first calibration sequence to RRU0 by using RRU1 is similar to a method for sending the first calibration sequence to RRU1 by using RRU0 in S202, and details are not described again in this embodiment.

RRU1 sends the first calibration sequence s(n) by using the antenna 0. After passing through a transmit channel of RRU1 and a receive channel of RRU0 and arriving at RRU0, the first calibration sequence becomes the third calibration sequence $r_{0,1}(n)$ where $$r_{0,0}(n) = h_{0,0}^r(n) \cdot h_{Air,01}(n) \cdot h_{1,0}^t(n) \cdot s(n); \qquad (13)$$

where $h_{Air,01}(n)$ is a channel response of an air interface of RRU0, $h_{1,0}^t(n)$ indicates a channel response of the $0^{th}$ service transmit channel of RRU1 on the $n^{th}$ subcarrier, and $h_{0,0}^r(n)$ indicates a channel response of the $0^{th}$ service receive channel of RRU0 on the $n^{th}$ subcarrier.

S204: Send the third calibration sequence received by RRU0 to RRU1.

In this embodiment, RRU0 is used as a calibration basis. Therefore, after receiving the third calibration sequence, RRU0 returns the calibration sequence to RRU1 through an air interface. The antenna 0 may be selected for returning the third calibration sequence, or another antenna may be selected for returning the third calibration sequence, and this embodiment sets no specific limitation thereto. A subsequent embodiment describes in detail a specific process of sending the third calibration sequence received by RRU0 to RRU1, and details are not described again in this embodiment.

S205: Acquire a calibration coefficient of RRU1 according to the second calibration sequence, the third calibration sequence, and the second self-calibration coefficient.

The acquiring a calibration coefficient of RRU1 according to the second calibration sequence, the third calibration sequence, and the second self-calibration coefficient includes:

acquiring a modification coefficient of RRU1 according to the second calibration sequence and the third calibration sequence; and acquiring the calibration coefficient of RRU1 according to the modification coefficient of RRU1 and the second self-calibration coefficient.

Preferably, acquiring the modification coefficient $\gamma(n)$ of RRU1 according to the second calibration sequence and the third calibration sequence may be performed by means of the following calculation:

$$\gamma(n) = \frac{\gamma_0(n)}{\gamma_1(n)} = \frac{h_{0,0}^r(n) h_{1,0}^t(n)}{h_{1,0}^r(n) h_{0,0}^t(n)}; \qquad (14)$$

Optionally, after the modification coefficient $\gamma(n)$ is obtained, the acquiring the calibration coefficient of RRU1 according to the modification coefficient and the second self-calibration coefficient includes:

using a ratio of the second sending self-calibration coefficient of the second self-calibration coefficient to the modification coefficient of RRU1 as a sending calibration coefficient of RRU1, where a formula is:

$$\tilde{\beta}_{1,i}^{DL}(n) = \frac{\beta_{1,i}^{DL}(n)}{\gamma(n)}; \qquad (15)$$

or, using a product of multiplying the second receiving self-calibration coefficient of the second self-calibration coefficient by the modification coefficient of the second RRU as a receiving calibration coefficient of RRU1, where a formula is:

$$\tilde{\beta}_{1,i}^{UL}(n) = \beta_{1,i}^{UL}(n) \cdot \gamma(n). \qquad (16)$$

The sending calibration coefficient or the receiving calibration coefficient of RRU1 is updated according to the foregoing formulas.

S206: Perform calibration on RRU1 according to the calibration coefficient of RRU1.

In this step, calibration is performed on RRU1 by using the obtained calibration coefficient of RRU1, thereby making RRU1 incline to RRU0. A specific process of performing calibration according to the calibration coefficient of RRU1 is similar to a process of performing calibration according to the second self-calibration coefficient, and details are not described again in this embodiment.

Beneficial effects of this embodiment include: self-calibration is separately performed on the first RRU and the second RRU, and a first self-calibration coefficient and a second self-calibration coefficient are respectively acquired; a first calibration sequence is transmitted to the second RRU by using the first RRU, where the first calibration sequence becomes a second calibration sequence when arriving at the second RRU; the first calibration sequence is transmitted to the first RRU by using the second RRU, where the first calibration sequence becomes a third calibration sequence when arriving at the first RRU; the third calibration sequence received by the first RRU is sent to the second RRU; and a calibration coefficient of the second RRU is acquired according to the second calibration sequence, the third calibration sequence, and the second self-calibration coefficient, so that joint channel calibration among multiple RRUs is completed based on one reference RRU.

Figure 6:
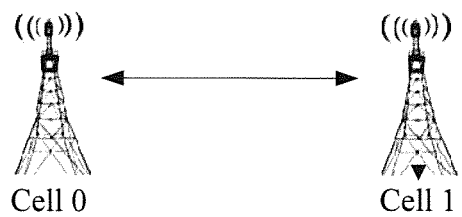
FIG. 6 is a schematic diagram of a cell scenario according to another embodiment of the present invention.

An embodiment provides a method for information transmission during channel calibration among RRUs, where transmitted content may be a received calibration sequence in a time domain form, a received calibration sequence in a frequency domain form, or other information such as a channel response that is acquired from a calibration sequence, and this embodiment sets no specific limitation thereto. As shown in FIG. 6, RRU0 represents cell 0, and RRU1 represents cell 1. Either of cell 1 and cell 0 may be selected as a reference calibration cell, and the reference calibration cell returns a received calibration sequence to the other cell through an air interface, where what is returned may be the received calibration sequence, or may be a channel response. It can be learned from formula 13 that the channel response is:

$$\gamma_0(n) = \frac{r_{0,0}(n)}{s(n)} = h_{0,0}^r(n) \cdot h_{Air,01}(n) \cdot h_{1,0}^t(n).$$

Figure 7:
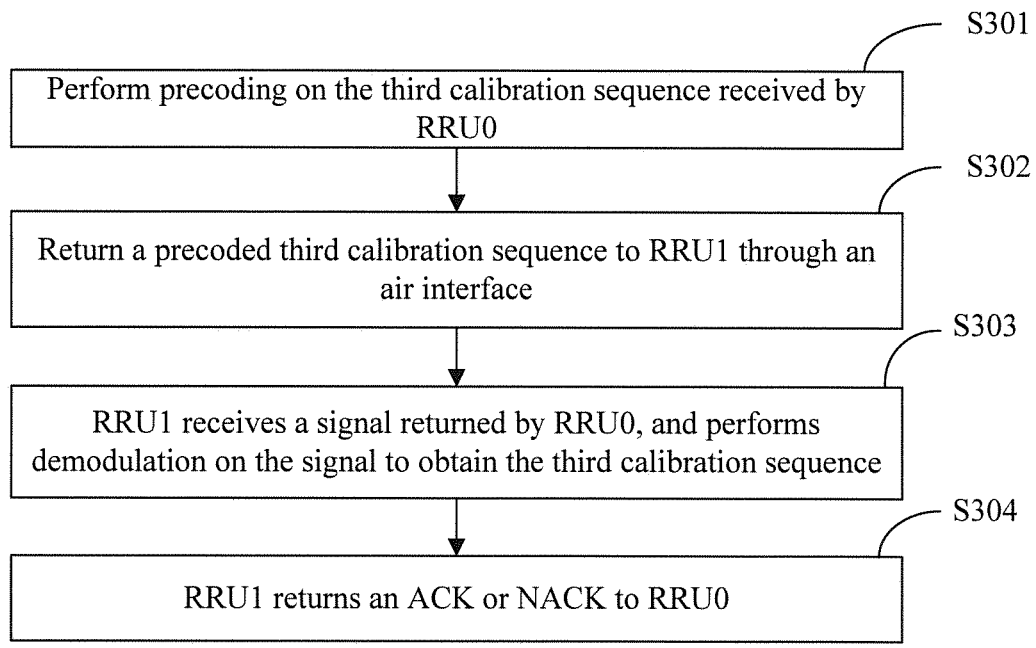
FIG. 7 is a flowchart of a method for information transmission during channel calibration among RRUs according to another embodiment of the present invention.

Referring to FIG. 7, a procedure of the method includes:

S301: Perform precoding on the third calibration sequence received by RRU0.

Preferably, the performing precoding on the third calibration sequence received by RRU0 includes:

(1) Perform quantization processing on the third calibration sequence, to obtain a to-be-sent data block.

After receiving a calibration sequence sent by RRU1, RRU0 needs to transmit the sequence to RRU1 without any error for mathematical processing. Before the transmission, quantization processing is performed on the received third calibration sequence, and quantized information is packetized to form a to-be-sent data block.

(2) Perform preprocessing on the to-be-sent data block, where the preprocessing includes but is not limited to one or more of the following operations: adding a CRC header to the to-be-sent data block, performing segmentation on the to-be-sent data block, performing error correction coding on the to-be-sent data block, performing a rate matching operation on the to-be-sent data block, and the like.

In this step, at least one of the following operations is performed on a quantized binary bit: adding a CRC header, segmentation, error correction coding, and rate matching, and this embodiment sets no specific limitation on an added operation.

(3) Perform modulation on preprocessed to-be-sent data, to obtain a precoded third calibration sequence.

After the preprocessed to-be-sent data is obtained, modulation is performed on the data. The modulation includes a constellation mapping method, which is similar to the prior art and not described again in this embodiment.

S302: Return the precoded third calibration sequence to RRU1 through an air interface.

Figure 8:
FIG. 8 is a schematic diagram of frequency domain sending according to another embodiment of the present invention.
Figure 9:
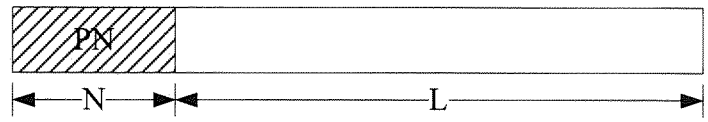
FIG. 9 is a schematic diagram of time domain sending according to another embodiment of the present invention.

In this step, precoded data is inserted into a known pilot for transmission, where an IFFT operation may be performed on the data after the data is inserted into the pilot, to change to time domain sending; or the data may be inserted into the pilot in a time domain and be directly sent in the time domain. A CP header is added in front of a data when frequency domain sending is used, or a PN pseudo-random sequence is added in front of the data when time domain sending is used. A CP length N is determined by a specific channel condition. FIG. 8 is a schematic diagram of frequency domain sending, and FIG. 9 is a schematic diagram of time domain sending, where N is a length of the CP header or the PN, and L is a length of the pilot.

Figure 10:
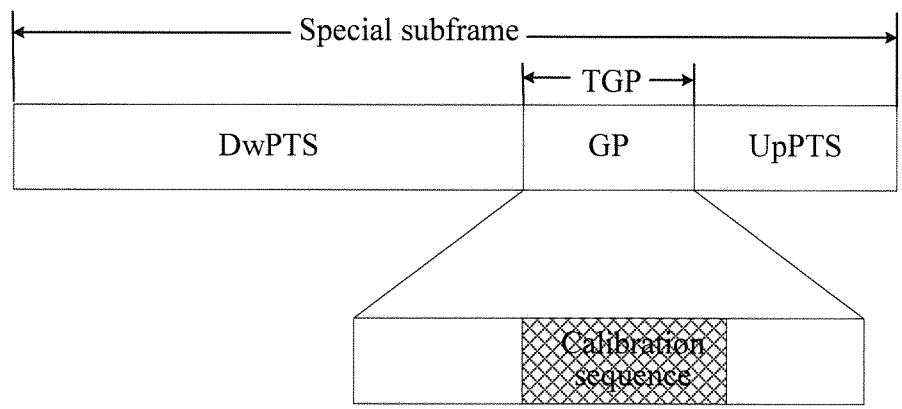
FIG. 10 is a schematic diagram of sending information by using an idle timeslot according to another embodiment of the present invention.

In this embodiment, the known pilot includes but is not limited to a GP (GAP, idle timeslot), a service subframe, or the like. The GP is a 96chip protection timeslot whose duration is 75 microseconds, and functions of the GP include: (1) protecting downlink-to-uplink conversion; (2) ensuring reliable DwPTS receiving during initial cell searching, and avoiding interference to working of a UL; (3) ensuring that a UpPTS can be sent in advance during random access, and avoiding interference to working of a DL; (4) determining a coverage distance. Optionally, the precoded third calibration sequence is inserted into an idle timeslot. Preferably, the idle timeslot and a timeslot for sending the first calibration sequence are the same. The precoded third calibration sequence is returned to the second RRU by using the idle timeslot. Certainly, the idle timeslot and the timeslot for sending the first calibration sequence may not be a same timeslot, and this embodiment sets no specific limitation thereto. An idle timeslot is used to implement transmission of a calibration sequence received by RRU0. After channel calibration is enabled, some idle timeslots are occupied by calibration sequence sending, and other idle timeslots are in an idle state. Therefore, an idle timeslot may be used for information transmission. For complexity reduction and system consistency, preferably, an information sending timeslot remains in a same mode as a channel calibration sending timeslot. In addition, multiple idle timeslots may be used to complete sending of one message. To further ensure transmission reliability, the second RRU may feedback an ACK/NACK to a first RRU in the foregoing two manners, to confirm whether a message is correctly received or needs to be sent again. FIG. 10 is a schematic diagram of using an idle timeslot to send a calibration sequence, where the calibration sequence occupies some of idle timeslots of a special subframe, DwPTS is a downlink timeslot, UpPTS is an uplink timeslot, and TGP is a size of a subframe occupied by the idle timeslots.

Figure 11:
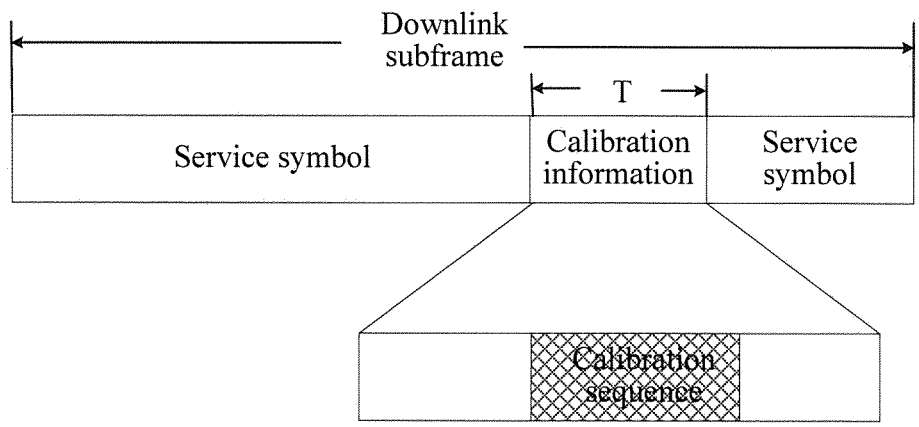
FIG. 11 is a schematic diagram of sending information by using a service subframe according to another embodiment of the present invention.

Optionally, in addition to transmitting the message by using an idle timeslot of the special subframe, a service subframe may also be used for the transmission. The precoded third calibration sequence is inserted into a service subframe, and the precoded third calibration sequence is returned to the second RRU by using the service subframe. FIG. 11 is a schematic diagram of sending a calibration sequence by using a service subframe. In specific transmission, a quantity of service symbols occupied by a to-be-sent message is configured according to an actual situation, and a calibration information part represents some of the service symbols occupied by the to-be-sent message. The to-be-sent message may be a calibration sequence, or may be a channel response of a channel to a calibration sequence. RRU0 sends a calibration sequence by using a downlink service subframe, and RRU1 receives the calibration sequence by using an uplink service subframe.

S303: RRU1 receives a signal returned by RRU0, and performs demodulation on the signal to obtain the third calibration sequence.

In this step, RRU1 performs demodulation on the received signal according to a traditional receiving algorithm, where the demodulation includes performing processing such as channel estimation, equalization, decoding, and CRC checking, to obtain the third calibration sequence. A specific decoding method is similar to the prior art, and details are not described again in this embodiment.

S304: RRU1 returns an ACK or NACK to RRU0.

If RRU1 correctly receives information sent by RRU0, RRU1 feeds back a correct receiving indication ACK to RRU0, and completes receiving. If RRU1 does not correctly receive the information sent by RRU0, RRU1 feeds back an NACK to require RRU0 to send the information again. If an error still exists after the information is retransmitted for N times, this time of channel calibration is terminated. N is determined by a specific condition, and this embodiment sets no specific limitation thereto. A manner of sending an ACK or NACK may be the same as a manner of sending the third calibration sequence, and details are not described in this embodiment.

In this embodiment, operations such as repeated coding, adding a pseudo-random scrambling code, performing coherent detection and receiving on RRU0 may be performed on the signal ACK/NACK feed back by RRU1 to RRU0, to ensure data reliability during a transmission process, which is similar to the prior art, and details are not described again in this embodiment.

In this embodiment, a third calibration sequence or a channel response of RRU0 to a third calibration sequence is sent to RRU1 by using an idle timeslot or a service subframe, and RRU1 parses out the third calibration sequence according to information returned by RRU0. During the whole process, no extra spectrum resource needs to be added, and sending of the third calibration sequence may be completed by using an existing idle resource, which provides an implementable manner for channel calibration of multiple RRUs that is based on one reference RRU.

Figure 12:
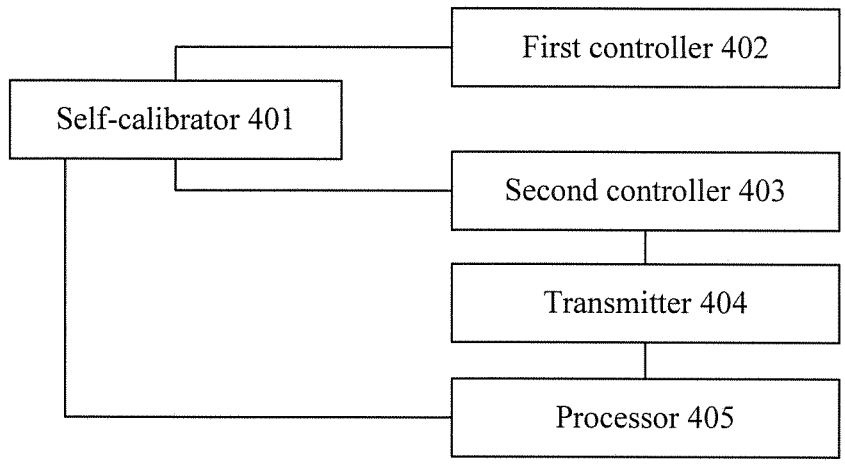
FIG. 12 is a schematic diagram of an apparatus for channel calibration among multiple RRUs according to another embodiment of the present invention.

Referring to FIG. 12, an embodiment provides an apparatus for channel calibration among multiple RRUs, which is configured to perform joint channel calibration among multiple RRUs in a communications system, where the communications system includes at least a first RRU and a second RRU, and the apparatus includes a self-calibrator 401, a first controller 402, a second controller 403, a transmitter 404, and a processor 405.

The self-calibrator 401 is configured to: separately perform self-calibration on the first RRU and the second RRU, and respectively acquire a first self-calibration coefficient and a second self-calibration coefficient.

The first controller 402 is configured to transmit a first calibration sequence to the second RRU by using the first RRU, where the first calibration sequence becomes a second calibration sequence when arriving at the second RRU.

The second controller 403 is configured to transmit the first calibration sequence to the first RRU by using the second RRU, where the first calibration sequence becomes a third calibration sequence when arriving at the first RRU.

The transmitter 404 is configured to send the third calibration sequence received by the first RRU to the second RRU.

The processor 405 is configured to acquire a calibration coefficient of the second RRU according to the second calibration sequence, the third calibration sequence, and the second self-calibration coefficient.

In a first possible implementation manner, the transmitter 404 is specifically configured to:

return, through an air interface, the third calibration sequence received by the first RRU to the second RRU.

Figure 13:
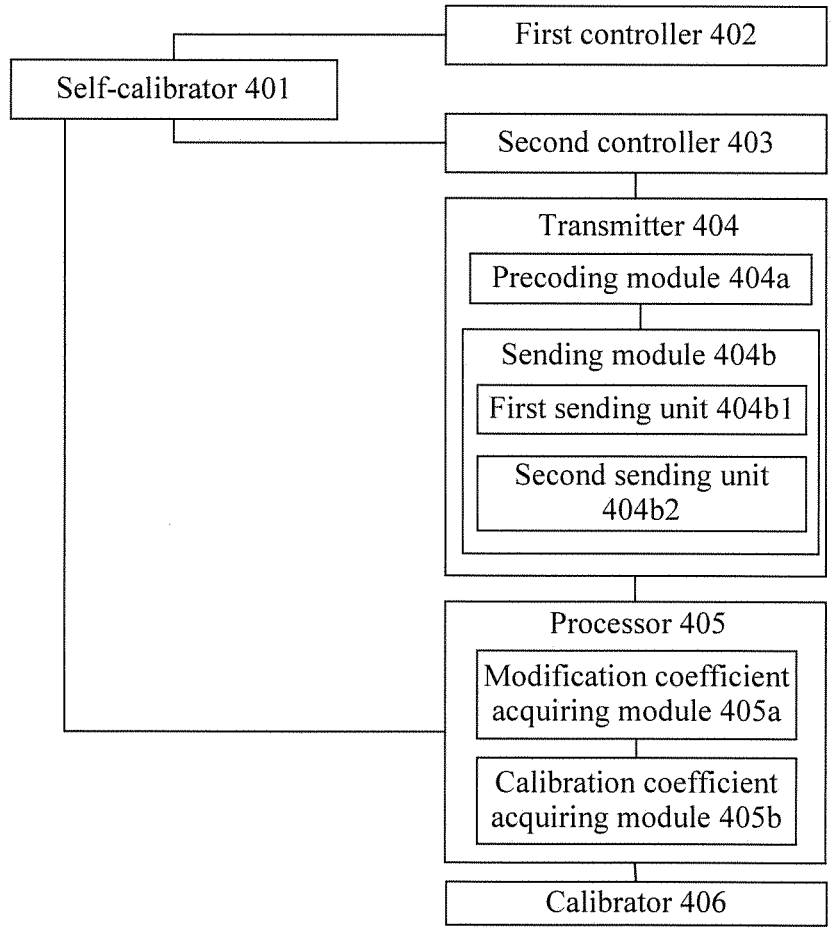
FIG. 13 is a schematic diagram of an apparatus for channel calibration among multiple RRUs according to another embodiment of the present invention.

In a second possible implementation manner of the first possible implementation manner, referring to FIG. 13, the transmitter 404 includes:

a precoding module 404a, configured to perform precoding on the third calibration sequence received by the first RRU; and a sending module 404b, configured to return a precoded third calibration sequence to the second RRU through the air interface.

In a third possible implementation manner of the second possible implementation manner of the first possible implementation manner, the precoding module 404a includes:

a quantization processing unit, configured to perform quantization processing on the third calibration sequence, to obtain a to-be-sent data block;

a preprocessing unit, configured to perform preprocessing on the to-be-sent data block, where the preprocessing includes one or more of the following operations: adding a CRC header to the to-be-sent data block, performing segmentation on the to-be-sent data block, performing error correction coding on the to-be-sent data block, and performing a rate matching operation on the to-be-sent data block; and a modulating unit, configured to perform modulation on preprocessed to-be-sent data, to obtain the precoded third calibration sequence.

In a fourth possible implementation manner of the second possible implementation manner of the first possible implementation manner, referring to FIG. 13, the sending module 404b includes:

a first sending unit 404b1, configured to insert the precoded third calibration sequence into an idle timeslot, where the idle timeslot and a timeslot for sending the first calibration sequence are the same, and return the precoded third calibration sequence to the second RRU by using the idle timeslot.

In a fifth possible implementation manner of the second possible implementation manner of the first possible implementation manner, the sending module 404b includes:

a second sending unit 404b2, configured to insert the precoded third calibration sequence into a service subframe, and return the precoded third calibration sequence to the second RRU by using the service subframe.

In a sixth possible implementation manner of the first, the second, the third, the fourth, or the fifth possible implementation manner, the first self-calibration coefficient includes a first sending self-calibration coefficient and a first receiving self-calibration coefficient, the second self-calibration coefficient includes a second sending self-calibration coefficient and a second receiving self-calibration coefficient, and the calibration coefficient of the second RRU includes a sending calibration coefficient of the second RRU and a receiving calibration coefficient of the second RRU.

In a seventh possible implementation manner of the first, the second, the third, the fourth, the fifth, or the sixth possible implementation manner, referring to FIG. 13, the processor 405 includes:

a modification coefficient acquiring module 405a, configured to acquire a modification coefficient of the second RRU according to the second calibration sequence and the third calibration sequence; and a calibration coefficient acquiring module 405b, configured to acquire the calibration coefficient of the second RRU according to the modification coefficient of the second RRU and the second self-calibration coefficient.

In an eighth possible implementation manner of the seventh possible implementation manner, the calibration coefficient acquiring module 405b is configured to:

use a ratio of the second sending self-calibration coefficient of the second self-calibration coefficient to the modification coefficient of the second RRU as the sending calibration coefficient of the second RRU; or use a product of multiplying the second receiving self-calibration coefficient of the second self-calibration coefficient by the modification coefficient of the second RRU as the receiving calibration coefficient of the second RRU.

In a ninth possible implementation manner of the first, the second, the third, the fourth, the fifth, the sixth, the seventh, or the eighth possible implementation manner, the apparatus further includes:

a calibrator 406, configured to perform calibration on the second RRU according to the calibration coefficient of the second RRU.

Beneficial effects of this embodiment include: self-calibration is separately performed on the first RRU and the second RRU, and a first self-calibration coefficient and a second self-calibration coefficient are respectively acquired; a first calibration sequence is transmitted to the second RRU by using the first RRU, where the first calibration sequence becomes a second calibration sequence when arriving at the second RRU; the first calibration sequence is transmitted to the first RRU by using the second RRU, where the first calibration sequence becomes a third calibration sequence when arriving at the first RRU; the third calibration sequence received by the first RRU is sent to the second RRU; and a calibration coefficient of the second RRU is acquired according to the second calibration sequence, the third calibration sequence, and the second self-calibration coefficient, so that joint channel calibration among multiple RRUs is completed based on one reference RRU.

It should be noted that: the apparatus for channel calibration among multiple RRUs that is provided by the foregoing embodiments merely takes the division of the foregoing function modules as an example for description. In an actual application, the foregoing functions may be allocated to different function modules for completion as required, that is, an internal structure of the apparatus is divided into different function modules to complete all or some of the functions described above.

In addition, the apparatus for channel calibration among multiple RRUs that is provided by the foregoing embodiments and the method embodiments for channel calibration among multiple RRUs pertain to a same concept. For a specific implementation process, refer to the method embodiments, which are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for channel calibration in a communications system, wherein the communications system comprises at least a first remote radio unit (RRU) and a second RRU, the method comprising:
    self-calibrating, by the communications system, the first RRU and the second RRU to acquire a first self-calibration coefficient and a second self-calibration coefficient, respectively;
    transmitting, by the communications system, a first calibration sequence to the second RRU from the first RRU to the second RRU, wherein the first calibration sequence is received by the second RRU as a second calibration sequence;
    transmitting, by the communications system, the first calibration sequence from the second RRU to the first RRU, wherein the first calibration sequence is received by the first RRU as a third calibration sequence;
    transmitting, by the communications system, the third calibration sequence from the first RRU to the second RRU through an air interface, wherein transmitting the third calibration sequence from the first RRU to the second RRU through an air interface comprises precoding the third calibration sequence and sending a precoded third calibration sequence to the second RRU through the air interface; and
    acquiring, by the communications system, a calibration coefficient of the second RRU according to the second calibration sequence, the third calibration sequence, and the second self-calibration coefficient.

2. The method according to claim 1, wherein precoding the third calibration sequence comprises:
    performing quantization processing on the third calibration sequence, to obtain a to-be-sent data block;
    preprocessing the to-be-sent data block, wherein the preprocessing comprises one or more of the following operations: adding a cyclic redundancy check (CRC) header to the to-be-sent data block, segmenting the to-be-sent data block, performing error correction coding on the to-be-sent data block, and performing a rate matching operation on the to-be-sent data block; and
    modulating the preprocessed to-be-sent data to obtain the precoded third calibration sequence.

3. The method according to claim 1, wherein sending the precoded third calibration sequence to the second RRU through the air interface comprises:
    sending the precoded third calibration sequence in an idle timeslot, wherein the idle timeslot and a timeslot for sending the first calibration sequence are a same timeslot.

4. The method according to claim 1, wherein sending the precoded third calibration sequence to the second RRU through the air interface comprises:
    sending the precoded third calibration sequence in a service subframe.

5. The method according to claim 1, further comprising:
    calibrating the second RRU according to the calibration coefficient of the second RRU.

6. A method for channel calibration in a communications system, wherein the communications system comprises at least a first remote radio unit (RRU) and a second RRU, the method comprising:
    self-calibrating, by the communications system, the first RRU and the second RRU to acquire a first self-calibration coefficient and a second self-calibration coefficient, respectively;
    transmitting, by the communications system, a first calibration sequence to the second RRU from the first RRU to the second RRU, wherein the first calibration sequence is received by the second RRU as a second calibration sequence;
    transmitting, by the communications system, the first calibration sequence from the second RRU to the first RRU, wherein the first calibration sequence is received by the first RRU as a third calibration sequence;
    transmitting, by the communications system, the third calibration sequence from the first RRU to the second RRU through an air interface;
    acquiring, by the communications system, a calibration coefficient of the second RRU according to the second calibration sequence, the third calibration sequence, and the second self-calibration coefficient; wherein:
    the first self-calibration coefficient comprises a first sending self-calibration coefficient and a first receiving self-calibration coefficient;
    the second self-calibration coefficient comprises a second sending self-calibration coefficient and a second receiving self-calibration coefficient; and
    the calibration coefficient of the second RRU comprises a sending calibration coefficient of the second RRU and a receiving calibration coefficient of the second RRU.

7. A method for channel calibration in a communications system, wherein the communications system comprises at least a first remote radio unit (RRU) and a second RRU, the method comprising:
    self-calibrating, by the communications system, the first RRU and the second RRU to acquire a first self-calibration coefficient and a second self-calibration coefficient, respectively;
    transmitting, by the communications system, a first calibration sequence to the second RRU from the first RRU to the second RRU, wherein the first calibration sequence is received by the second RRU as a second calibration sequence;
    transmitting, by the communications system, the first calibration sequence from the second RRU to the first RRU, wherein the first calibration sequence is received by the first RRU as a third calibration sequence;
    transmitting, by the communications system, the third calibration sequence from the first RRU to the second RRU through an air interface; and
    acquiring, by the communications system, a calibration coefficient of the second RRU according to the second calibration sequence, the third calibration sequence, and the second self-calibration coefficient;
    wherein acquiring, by the communications system, the calibration coefficient of the second RRU according to the second calibration sequence, the third calibration sequence, and the second self-calibration coefficient comprises:
  acquiring a modification coefficient of the second RRU according to the second calibration sequence and the third calibration sequence; and
  acquiring the calibration coefficient of the second RRU according to the modification coefficient of the second RRU and the second self-calibration coefficient.

8. The method according to claim 7, wherein acquiring the calibration coefficient of the second RRU according to the modification coefficient of the second RRU and the second self-calibration coefficient comprises:
  calculating a ratio of the second sending self-calibration coefficient of the second self-calibration coefficient to the modification coefficient of the second RRU and taking the ratio as the sending calibration coefficient of the second RRU; or
  calculating a product of multiplying the second receiving self-calibration coefficient of the second self-calibration coefficient by the modification coefficient of the second RRU and taking the product as the receiving calibration coefficient of the second RRU.

9. An apparatus in a communications system, wherein the communications system comprises at least a first remote radio unit (RRU) and a second RRU, the apparatus comprising:
  a computing hardware; and
  a non-transitory computer-readable storage medium comprising computer-executable instructions that, when executed by the computing hardware, cause the apparatus to:
    transmit a first calibration sequence to the second RRU from the first RRU to the second RRU, wherein the first calibration sequence is received by the second RRU as a second calibration sequence,
    transmit the first calibration sequence from the second RRU to the first RRU, wherein the first calibration sequence is received by the first RRU as a third calibration sequence,
    transmit the third calibration sequence from the first RRU to the second RRU through an air interface,
    precode the third calibration sequence and sending a precoded third calibration sequence to the second RRU through the air interface, and
    acquire a calibration coefficient of the second RRU according to the second calibration sequence, the third calibration sequence, and the second self-calibration coefficient.

10. The apparatus according to claim 9, wherein the non-transitory computer-readable storage medium further comprises computer-executable instructions that, when executed by the computing hardware, cause the apparatus to:
  perform quantization processing on the third calibration sequence, to obtain a to-be-sent data block;
  preprocess the to-be-sent data block; and
  modulate the preprocessed to-be-sent data to obtain the precoded third calibration sequence.

11. The apparatus according to claim 9, wherein the non-transitory computer-readable storage medium further comprises computer-executable instructions that, when executed by the computing hardware, cause the apparatus to:
  send the precoded third calibration sequence in an idle timeslot, wherein the idle timeslot and a timeslot for sending the first calibration sequence are a same timeslot.

12. The apparatus according to claim 9, wherein the non-transitory computer-readable storage medium further comprises computer-executable instructions that, when executed by the computing hardware, cause the apparatus to:
  send the precoded third calibration sequence in a service subframe.

13. An apparatus in a communications system, wherein the communications system comprises at least a first remote radio unit (RRU) and a second RRU, the apparatus comprising:
  a computing hardware; and
  a non-transitory computer-readable storage medium comprising computer-executable instructions that, when executed by the computing hardware, cause the apparatus to:
    transmit a first calibration sequence to the second RRU from the first RRU to the second RRU, wherein the first calibration sequence is received by the second RRU as a second calibration sequence,
    transmit the first calibration sequence from the second RRU to the first RRU, wherein the first calibration sequence is received by the first RRU as a third calibration sequence,
    transmit the third calibration sequence from the first RRU to the second RRU through an air interface, and
    acquire a calibration coefficient of the second RRU according to the second calibration sequence, the third calibration sequence, and the second self-calibration coefficient; wherein:
    the first self-calibration coefficient comprises a first sending self-calibration coefficient and a first receiving self-calibration coefficient;
    the second self-calibration coefficient comprises a second sending self-calibration coefficient and a second receiving self-calibration coefficient; and
    the calibration coefficient of the second RRU comprises a sending calibration coefficient of the second RRU and a receiving calibration coefficient of the second RRU.

14. An apparatus in a communications system, wherein the communications system comprises at least a first remote radio unit (RRU) and a second RRU, the apparatus comprising:
  a computing hardware; and
  a non-transitory computer-readable storage medium comprising computer-executable instructions that, when executed by the computing hardware, cause the apparatus to:
    transmit a first calibration sequence to the second RRU from the first RRU to the second RRU, wherein the first calibration sequence is received by the second RRU as a second calibration sequence,
    transmit the first calibration sequence from the second RRU to the first RRU, wherein the first calibration sequence is received by the first RRU as a third calibration sequence,
    transmit the third calibration sequence from the first RRU to the second RRU through an air interface,
    acquire a calibration coefficient of the second RRU according to the second calibration sequence, the third calibration sequence, and the second self-calibration coefficient,
    acquire a modification coefficient of the second RRU according to the second calibration sequence and the third calibration sequence, and acquire the calibration coefficient of the second RRU according to the modification coefficient of the second RRU and the second self-calibration coefficient.

15. The apparatus according to claim 14, wherein the non-transitory computer-readable storage medium further comprises computer-executable instructions that, when executed by the computing hardware, cause the apparatus to:
calculate a ratio of the second sending self-calibration coefficient of the second self-calibration coefficient to the modification coefficient of the second RRU and taking the ratio as the sending calibration coefficient of the second RRU; or
calculate a product of multiplying the second receiving self-calibration coefficient of the second self-calibration coefficient by the modification coefficient of the second RRU and taking the product as the receiving calibration coefficient of the second RRU.

\* \* \* \* \*